United States Patent
Branson et al.

(10) Patent No.: US 9,158,784 B2
(45) Date of Patent: Oct. 13, 2015

(54) COMPRESSING TUPLES IN A STREAMING APPLICATION

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 258 days.

(21) Appl. No.: 13/833,649

(22) Filed: Mar. 15, 2013

(65) Prior Publication Data

US 2014/0279968 A1    Sep. 18, 2014

Related U.S. Application Data

(63) Continuation of application No. 13/826,670, filed on Mar. 14, 2013.

(51) Int. Cl.
*G06F 17/30* (2006.01)
*G06F 9/50* (2006.01)

(52) U.S. Cl.
CPC .......... *G06F 17/30153* (2013.01); *G06F 9/50* (2013.01); *G06F 9/5083* (2013.01)

(58) Field of Classification Search
CPC .... G06F 9/50; G06F 9/5083; G06F 17/30153
USPC ........................................................ 707/693
See application file for complete search history.

(56) References Cited

U.S. PATENT DOCUMENTS

| | | | |
|---|---|---|---|
| 6,311,224 B1* | 10/2001 | Packard | ........................ 709/247 |
| 6,615,275 B2 | 9/2003 | Yohe et al. | |
| 7,613,848 B2 | 11/2009 | Amini et al. | |
| 7,644,110 B2 | 1/2010 | Nishizawa et al. | |
| 8,095,690 B2 | 1/2012 | Kashiyama et al. | |
| 8,214,521 B2 | 7/2012 | Takagi et al. | |
| 8,296,331 B2 | 10/2012 | Chkodrov et al. | |
| 2009/0319687 A1* | 12/2009 | Goldstein et al. | ............. 709/241 |
| 2010/0106946 A1 | 4/2010 | Imaki et al. | |

(Continued)

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.
Santosuosso et al., "Management System for Processing Streaming Data", Filed Jul. 26, 2011. U.S. Appl. No. 13/190,810.

*Primary Examiner* — Jensen Hu
(74) *Attorney, Agent, or Firm* — Richard A. Wilhelm; James R. Nock

(57) ABSTRACT

A method, system, and computer program product to process data in a streaming application are disclosed. The method, system, and computer program product may include receiving a stream of tuples to be processed by a plurality of processing elements operating on a plurality of compute nodes. The method, system, and computer program product may determine whether a first processing element has additional processing capacity. In some embodiments, the method, system, and computer program product determine whether a second processing element, which receives its input from the first processing element, also has additional processing capacity. The method, system, and computer program product may employ compression at the first processing element if one of the first and the second processing element has additional processing capacity.

13 Claims, 7 Drawing Sheets

(56) References Cited

U.S. PATENT DOCUMENTS

| | | |
|---|---|---|
| 2010/0292980 A1* | 11/2010 | Andrade et al. ................ 703/22 |
| 2012/0084322 A1 | 4/2012 | Goldstein et al. |
| 2012/0110042 A1 | 5/2012 | Barsness et al. |
| 2012/0215934 A1 | 8/2012 | Barsness et al. |
| 2012/0218268 A1 | 8/2012 | Accola et al. |
| 2014/0167987 A1* | 6/2014 | Pell et al. ........................ 341/59 |
| 2014/0279965 A1* | 9/2014 | Branson et al. ............... 707/693 |
| 2014/0279968 A1 | 9/2014 | Branson et al. |

* cited by examiner

COMPRESSING TUPLES IN A STREAMING APPLICATION

CROSS-REFERENCE TO RELATED APPLICATIONS

This application is a continuation of co-pending U.S. patent application Ser. No. 13/826,670, filed Mar. 14, 2013. The aforementioned related patent application is herein incorporated by reference in its entirety.

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

In one embodiment, a method to process data in a streaming application is described. The method may include receiving a stream of tuples to be processed by a plurality of processing elements operating on a plurality of compute nodes. The method may determine whether a first processing element has additional processing capacity. In some embodiments, the method determines whether a second processing element, which receives its input from the first processing element, also has additional processing capacity. The method may employ compression at the first processing element if one of the first processing element and the second processing element has additional processing capacity.

In another embodiment, a system for processing data in a streaming application is described. The system may include a plurality of processing elements configured to receive a stream of tuples, the plurality of processing elements operating on one or more compute nodes, each compute node having one or more computer processors. The system may include a performance monitor configured to maintain one or more performance statistics corresponding to each of the plurality of processing elements. The performance statistics may indicate whether each of the plurality of processing elements has additional processing capacity. If one of a first processing element and a second processing element, which receives its input from the first processing element, has additional processing capacity, compression may be employed at the first processing element.

Yet another embodiment is directed to a computer program product.

BRIEF DESCRIPTION OF THE DRAWINGS

Embodiments will be better understood from the following detailed description with reference to the drawings, in which.

Like reference numbers and designations in the various drawings indicate like elements.

DETAILED DESCRIPTION

Figure 1:
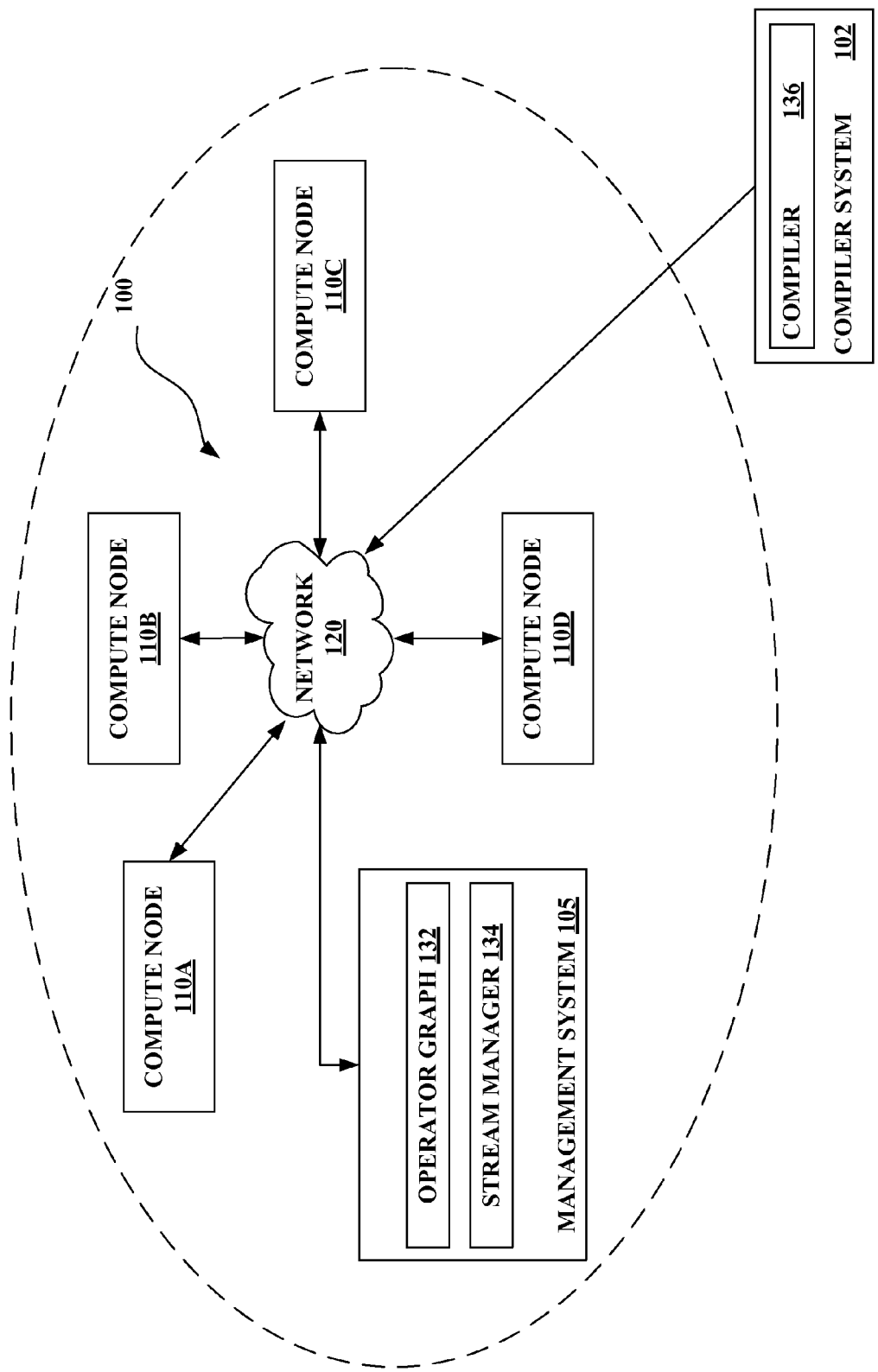
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with an entity. Attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used in this description and the claims that follow, "stream" or "data stream" refers to a sequence of tuples. Generally, a stream may be considered a pseudo-infinite sequence of tuples.

Tuples are received and output by processing elements. A tuple corresponding with a particular entity, i.e., a particular piece of data, received by a processing element, however, is generally not considered to be the same tuple that is output downstream, even if it corresponds with the same entity or data. Typically, the output tuple is changed in some way by the processing element. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to in this description and the claims that follow as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

In stream-based computing applications, the stream operators and processing elements of an operator graph may be distributed across multiple compute nodes as well as within individual compute nodes. Stream operators and processing elements may be connected by inter-stream operator communication paths. An "inter-stream communication path" may refer to operations that employ a shared memory segment, a pipe, a named pipe (also known as FIFO), a message queue, a memory mapped file, a UNIX domain or inter-process communication socket, or any other similar operation. An inter-stream operator communication path may also refer to operations that use a network and employ an Internet socket, such as a TCP/IP socket, a stream socket, a datagram socket, or any other similar operation.

The stream operators and processing elements within a compute node may be connected by inter-stream operator communication paths, such as operations that employ a shared memory segment, a pipe, a named pipe, a message queue, a memory mapped file, a UNIX domain or inter-process communication socket, or any other similar operation. Processing elements on distinct compute nodes may be connected by a network having one or more links and communication operations that employ an inter-network or Internet socket, such as a TCP/IP socket, a stream socket, or a datagram socket, or any other similar operation.

Embodiments of this disclosure are directed to a method and apparatus that enhance the ability of a streaming application to efficiently share data. For example, network bandwidth is a limited resource that may constrain efficiently transmitting data between compute nodes in a streaming application. Compressing tuples prior to transmitting them across the communications network may mitigate this issue. Compressing one or more tuples reduces the size of the tuple in memory, and accordingly may reduce the amount of network resources utilized. This may slow down a single process (because of having to compress and decompress the tuples for processing), but allow for quicker transmission times across the compute nodes.

Streaming applications may run in distributed environments, in which a single application is distributed across a plurality of compute nodes. Portions of the application may be referred to as processing elements in this description and the claims that follow (explained in further detail below). Each processing element has resources associated with it and may run at different speeds for a variety of reasons. The overall performance of the streaming application may be a factor of the slowest processing element. That is, in order for data to flow completely through a streaming application, the slowest processing element or elements of the application may define the performance constraints for the overall application. The other processing elements may be considered to be completing processing tasks and operations faster than desired ("over performing") when not performing similarly to the slowest processing element(s). An over-performing processing element may have capacity to perform additional operations without affecting the performance of the streaming application as a whole, i.e., an over-performing processing element may have additional processing capacity. "Additional processing capacity" may refer to some amount of time that a processing element may have available and use in place of waiting for a new tuple to process. In other embodiments, the additional processing capacity may be measured by something other than time, such as CPU cycles.

According to various embodiments, a streaming application may be modified during its runtime such that resources, such as network bandwidth, may be preserved. An example of a runtime modification to a streaming application includes compressing tuples. Compressing tuples may include compressing the data contents of the tuple. Additional processing may be required at an over-performing processing element in order to compress the tuple. This additional processing may increase the time the processing element is operating on the particular tuple, thereby leveling the performance of the over-performing and underperforming processing elements by utilizing the additional processing capacity of the over-performing processing element. Further, utilizing the additional processing capacity of the over-performing processing element and transmitting a compressed tuple may reduce the amount of network bandwidth consumed by the transmission, which may reduce network-based performance issues.

The performance of a particular processing element in a streaming application may be measured with processing times for a tuple, throughput, and/or latency, according to some embodiments. "Processing time" may refer to the amount of time a processing element takes to process a particular tuple. "Throughput" may represent the rate at which tuples flow through a processing element per unit of time. For example, the throughput may be 10,000 tuples per second if the processing time is 0.0001 seconds. Throughput may be determined by both the average time required to process a tuple and the quantity of tuples received per unit of time by a processing element. "Latency" may refer to the amount of time a particular tuple is at a processing element. That is, the latency may be the time difference between the timestamp at which the tuple is received at a processing element and the timestamp at which the tuple is output from the processing element, including time in which the tuple is waiting to be processed.

Another indicator of the performance of a particular processing element may be whether there is a queue of tuples waiting to be processed. This may occur, for example, when one or more processing elements provide an input stream to a receiving processing element at a rate that is faster than the receiver can process the tuples. This concept may be referred to in this description and the claims that follow as a "bottleneck." Additionally, the processing elements or stream operators at which the bottleneck occurs may be referred to in this description and the claims that follow as a "bottleneck stream operator" or "bottleneck processing element." A "queue" may be an average, maximum, or mode queue length, or any other suitable metric.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
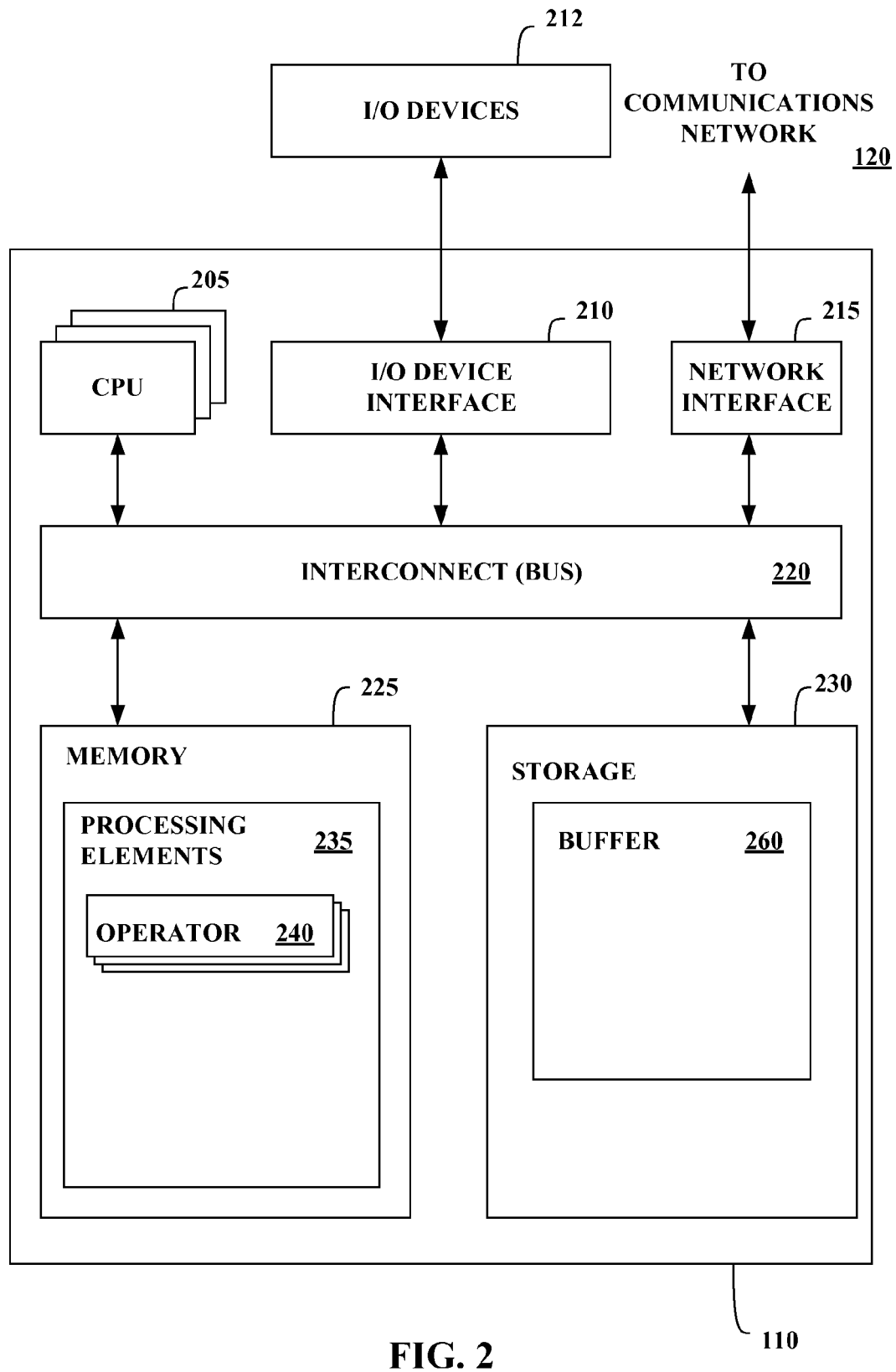
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. Alternatively, the interconnect 220 may be a crossbar switch, a banyan switch, an omega switch, or other switching fabric in various embodiments. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
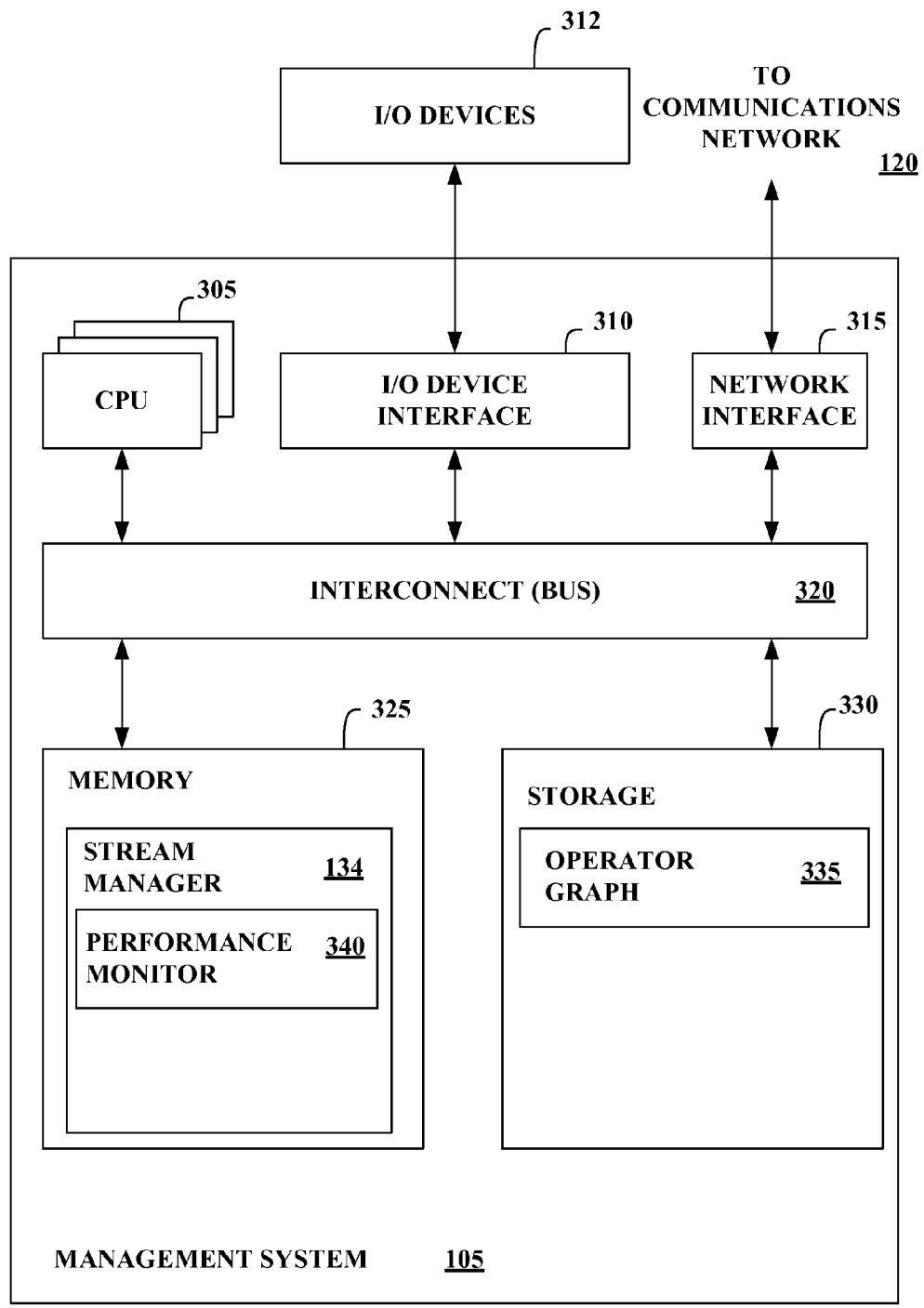
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing. As shown in FIG. 3, the stream manager 134 may contain a performance monitor 340. The performance monitor 340 may monitor a streaming application, maintaining statistics that represent the performance of the various processing elements that make up the streaming application. The functionality of the performance monitor 340 is discussed in further detail in accordance with FIGS. 6 and 7 below. In some embodiments, the performance monitor 340 may be a part of the stream manager 134 as shown in FIG. 3. In other embodiments, the performance monitor 340 may be invoked at runtime, but may be a separate entity from the stream manager 134.

Figure 4:
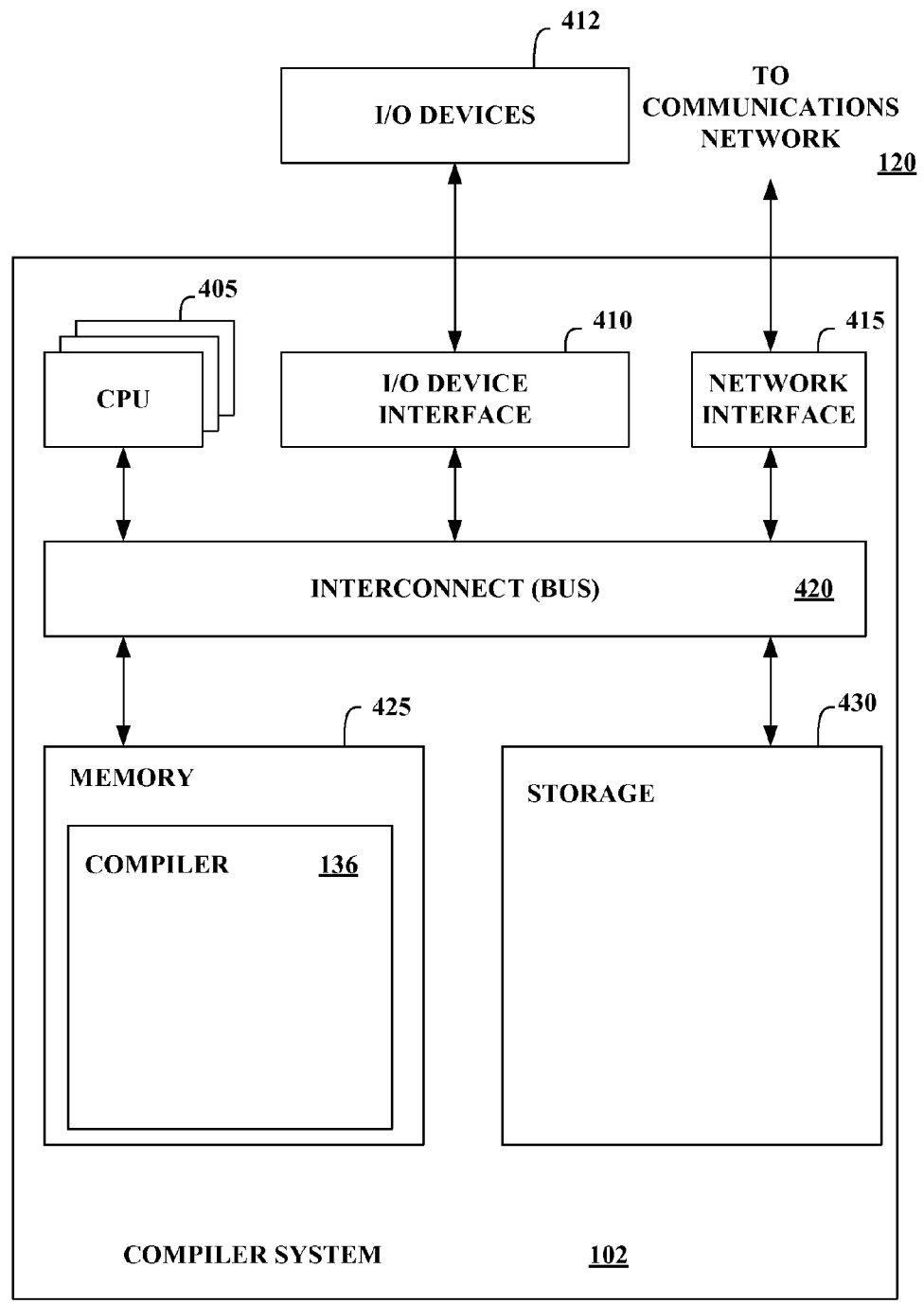
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and a storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
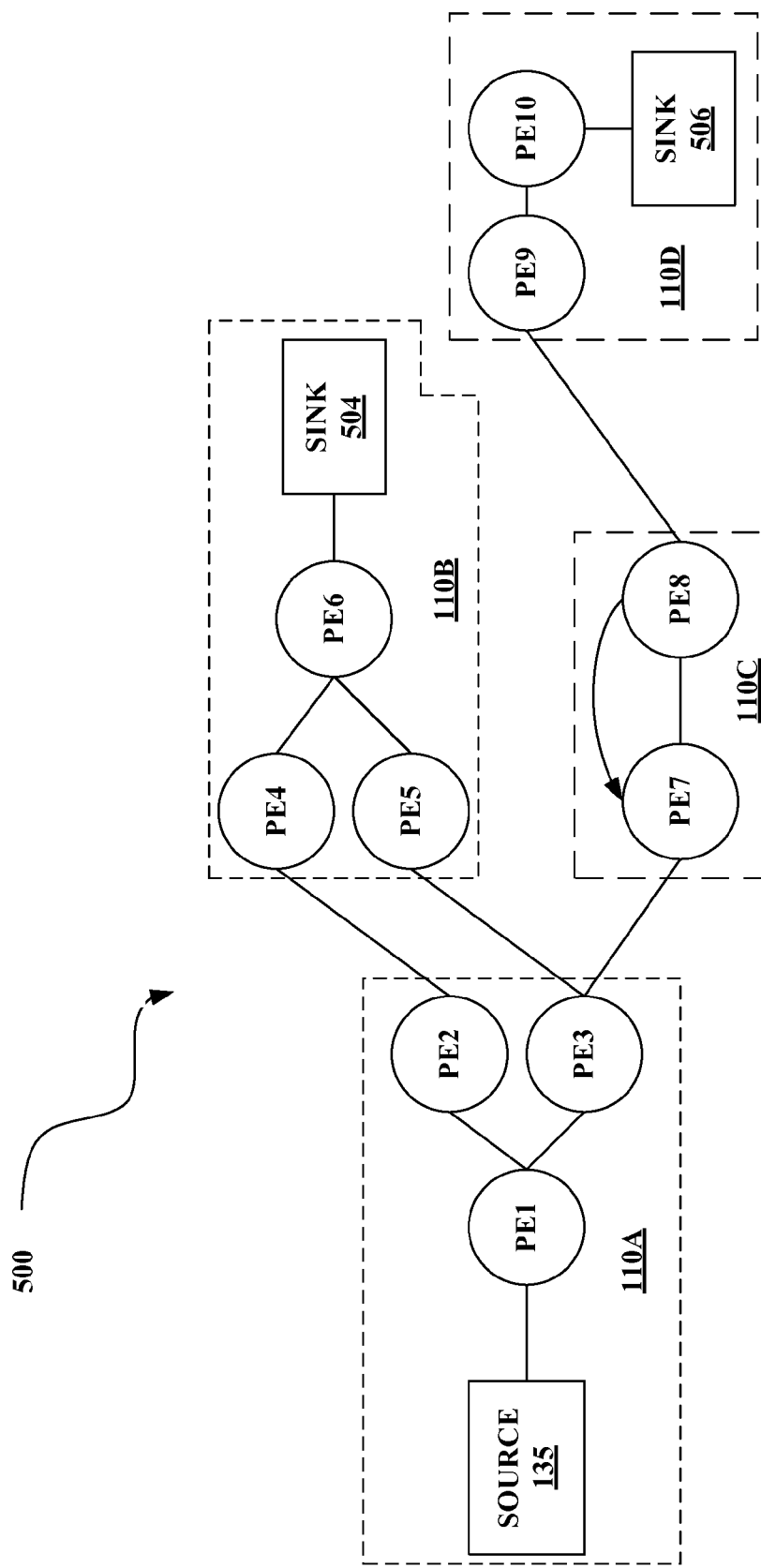
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to in this description and the claims that follow as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
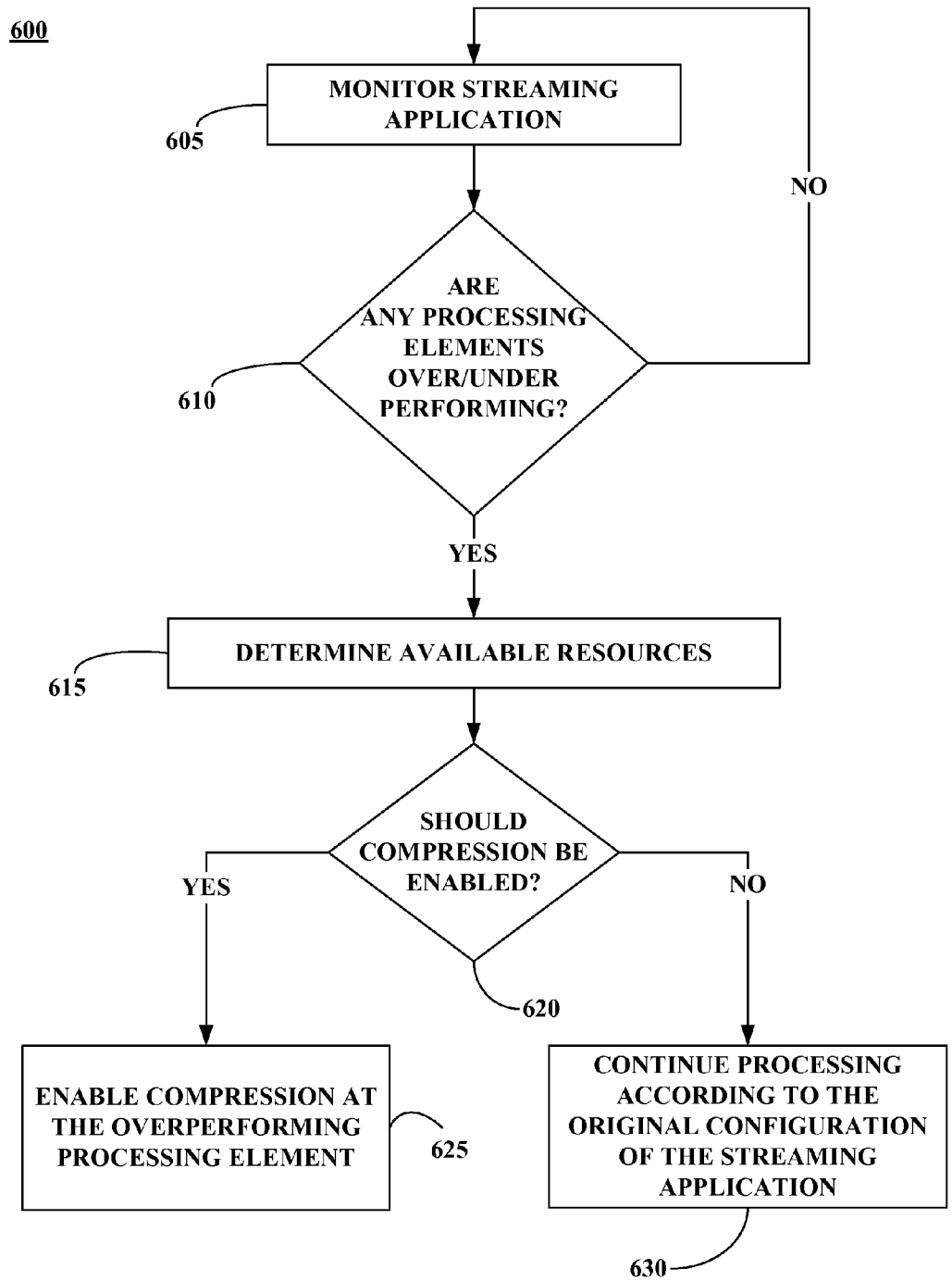
FIG. 6 illustrates a flowchart of a method to enable compression at a processing element in a streaming application according to various embodiments.

FIG. 6 illustrates a flowchart of a method 600 to enable compression at a processing element in a streaming application, according to various embodiments. Generally, the method 600 may include monitoring the performance of a streaming application and modifying a processing element based on one or more performance metrics which may indicate that a processing element has additional processing capacity. In some embodiments, this may include a comparison of performance metrics describing the performance of different processing elements. In other embodiments, the performance metric may be a single metric. In yet other embodiments, the performance metric may be compared with a threshold value that may be a system default value, but capable of being overridden by a user. A performance metric may include processing time for a particular tuple, throughput, latency, number of tuples queued to be processed at a particular processing element, or other similar performance metrics for a processing element.

The method 600 may identify a portion of a streaming application that is over performing relative to the performance of the overall streaming application. In other embodiments, the method 600 may identify a portion of a streaming application that is over performing relative to the performance of one or more portions of the streaming application and compress one or more tuples accordingly. The over-performing portion may include processing elements that have additional processing capacity. In some embodiments, the method 600 may identify a portion of the streaming application that is underperforming relative to the performance of one or more portions of the streaming application and compress one or more tuples accordingly. In yet other embodiments, a processing element or stream operator may not be modified even when a portion of the streaming application is either over performing or underperforming.

As shown in FIG. 6, the method 600 may begin at operation 605. Operation 605 may include monitoring a streaming application during runtime. The monitoring may be performed by a performance monitor, e.g., performance monitor 340 (FIG. 3). The performance monitor 340 may maintain statistics about one or more processing elements in the streaming application. These statistics may, for example, be based on a processing time at a processing element. In other embodiments, the performance monitor may maintain statistics related to throughput or latency for processing tuples at a processing element. The performance monitor may also maintain statistics that include the mean, median, or mode of tuples queued at a processing element to be processed in some embodiments.

In some embodiments, operation 605 may also include maintaining a history of the performance metrics over time. Maintaining a history of the performance metrics during runtime may allow a compiler, e.g., compiler 136 (FIG. 4), to account for the actual performance of a streaming application at compile time. The compiler may accordingly deploy the streaming application in a manner which accounts for the performance characteristics that have been observed over time.

At operation 610, the performance monitor 340 may determine how the performance statistics for the individual processing elements compare across the application. Operation 610 may identify whether the streaming application is running smoothly or in a balanced manner, i.e., the processing elements are running at similar speeds across the application.

The performance monitor 340 may make this determination by evaluating performance metrics. For example, the performance monitor 340 may identify a processing element that has a queue of tuples to be processed where the number of tuples queued falls outside a threshold. In some embodiments, the threshold may be a quantity of tuples in the queue or a time period that the queue is present at the processing element. The threshold may be a system-defined value and may be configured by an application programmer or user.

The performance monitor 340 may evaluate the performance metrics by comparing the values of the performance metrics at different processing elements. For example, the performance monitor 340 may determine that a first processing element has a processing time of 0.0015 seconds, while a second processing element (which receives input from the first processing element) has a processing time of 0.0001 seconds. The first processing element has a slower processing time than the second processing element, which may be an indication that the second processing element is over performing relative to the first processing element, a portion of the application, or the application as a whole. This may also be an indication that the over-performing processing element has additional processing capacity. Conversely, the comparison may indicate that the first processing element is underperforming relative to the second processing element, a portion of the application, or the application as a whole.

The performance monitor 340 may evaluate the performance metrics by comparing the throughput of processing elements. As described above, the throughput is the rate at which tuples flow through a processing element. Relying on the example processing times in the previous paragraph, a first processing element may have a throughput of 667 tuples per second, while a second processing element may have a throughput of 10,000 tuples per second. The second processing element is able to output tuples at a rate that is substantially higher than the first processing element, but because of the rate of output by the first processing element, the output of the second processing element may be limited. This may be an indication that the first processing element is a bottleneck. This substantial difference is an indication that the first processing element is underperforming and the second processing element is over performing, as compared with each other.

The performance monitor 340 may also evaluate the performance metrics by comparing the latency of processing elements. As described above, latency is the time period that a tuple is at a particular processing element—including the time spent waiting to be processed and the time spent actually being processed. If a first processing element has a latency of 0.0018 seconds and a second processing element has a latency of 0.0003 seconds, this may be an indication that the first processing element is underperforming and the second processing element is over performing, as compared with each other.

If the performance monitor 340 determines that no processing elements are either over performing or underperforming, i.e., none of the processing elements have additional processing capacity, or that over-performing or underperforming is inside a threshold, then the performance monitor 340 may continue to monitor the streaming application. This determination may, for example, be affected by: the current workload of the computer system, the hardware constraints, or the impact of other applications on the computer system. If the performance monitor 340 determines that any processing elements are either over performing or underperforming, i.e., any of the processing elements have additional processing capacity, the method 600 may continue with operation 615.

At operation 615, the stream manager 134 may determine resources that are available to the streaming application. This operation may include gathering information about whether there are resources available which may allow the stream manager 134 to enable compression at a processing element. Accordingly, this may include obtaining statistics, such as whether CPU resources are available to add compression and decompression, whether the network bandwidth is low, or other similar information that may inform the decision of the stream manager to enable compression.

At operation 620, the stream manager may determine whether compression should be enabled. The decision of operation 620 may be based on whether one or more processing elements have additional processing capacity. In some embodiments, this may include determining whether a processing element has additional processing capacity to complete the decompression of a compressed tuple in order to process the tuple. The decision of operation 620 may be informed from the resource availability determination of operation 615. Operation 620 may include a weighing of the available CPU resources versus the network bandwidth limitations. In some embodiments, operation 620 includes a performance threshold that the comparison of the performance metrics for the processing elements is measured against that controls whether to enable compression. In other embodiments, the determination of operation 620 includes a comparison of the time available to compress a tuple versus the expected duration of running compression techniques. In yet other embodiments, operation 620 may include a combination of these considerations.

Based on the determination at operation 620, the stream manager 134 may enable compression at an over-performing processing element, as shown in operation 625. Conversely, if the determination at operation 620 results in a finding that the streaming application does not have available resources to enable compression or is not actually low on network bandwidth, the method 600 may continue processing according to the original configuration of the application, as shown in operation 630.

Figure 7:
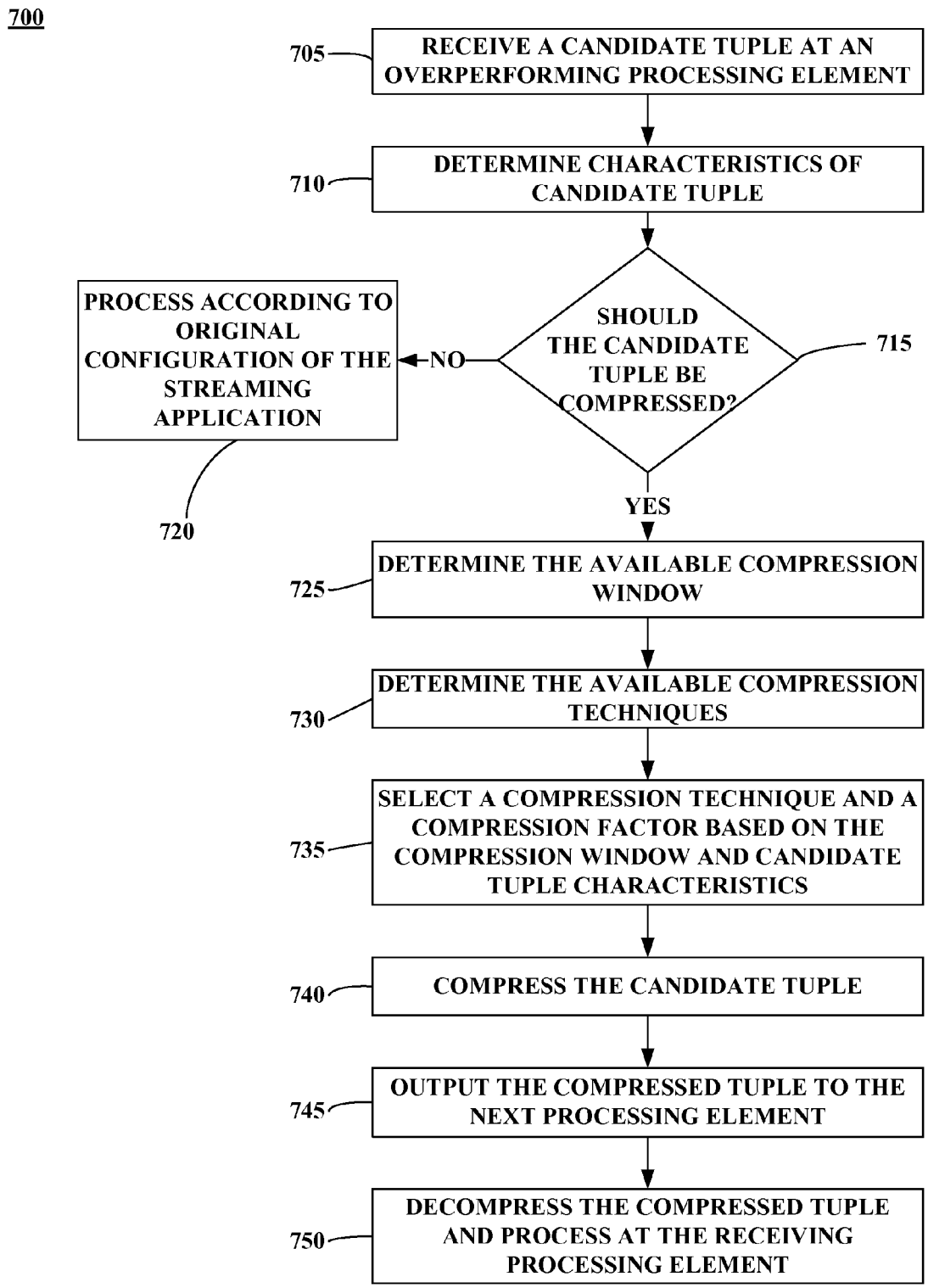
FIG. 7 illustrates a flowchart of a method to determine how to enable compression at one or more processing elements in a streaming application according to various embodiments.

FIG. 7 illustrates a flowchart of a method 700 to determine how to enable compression at one or more processing elements in a streaming application, according to various embodiments. The method 700 may be executed if operation 625 (FIG. 6) enables compression at one or more over-performing processing elements. The over-performing processing element may have additional processing capacity. In the discussion of FIG. 7, the compression will be referred to generically. However, compression may include techniques for compressing data such as lossy compression or lossless compression, and the various techniques that represent each method. In some embodiments, the compression may include a configurable compression factor, which may be system-defined but capable of being overridden by a user, e.g., an application programmer, system administrator, or end-user. Compression may take varying amounts of time, depending on the technique used, the amount of compression, the type of attributes in the tuple, or other similar factors. The compression technique employed may be selected based on utilizing the additional processing capacity of an over-performing processing element without exceeding that additional capacity.

The method 700 may begin at operation 705, in which an over-performing processing element, i.e., a processing element having additional processing capacity, receives a candidate tuple, i.e., a tuple that is a candidate for compression. In some embodiments, every tuple received at a processing element that is enabled for compression may be a candidate tuple. In other embodiments, every tuple received at a processing element with compression enabled may not be a candidate tuple. For example, some embodiments may limit candidate tuples based on count (i.e., every Nth tuple is a candidate tuple), time (the tuple received every N seconds is a candidate), or other similar limitations. In other embodiments, a candidate tuple may be any tuple received when the additional processing capacity of a tuple is outside a threshold. After receiving a candidate tuple at an over-performing processing element, the stream manager 134 may determine the characteristics of the candidate tuple at operation 710.

Determining the characteristics of the candidate tuple in operation 710 may include identifying the features of the candidate tuple that may determine whether the candidate tuple should be compressed by the processing element. Determining the characteristics may include reading the metadata associated with the candidate tuple. In other embodiments, determining the characteristics may include determining the type and size of each attribute within the candidate tuple. The size of the entire candidate tuple may be determined as well. Additional characteristics of the candidate tuple may be determined if they will better inform the determination of whether to compress the candidate tuple.

At operation 715, the stream manager 134 may determine whether the candidate tuple should be compressed. Operation 715 may rely on the characteristics of the candidate tuple as determined in operation 710. In some embodiments, a candidate tuple should only be compressed if the size of the tuple is outside a threshold. The threshold may be system-defined, but a user may be able to configure the threshold. In other embodiments, a candidate tuple should only be compressed if it contains certain types of attributes. For example, a candidate tuple that contains only text strings may not be compressed whereas a candidate tuple that contains images, audio, or video may be compressed. The attribute types corresponding to a decision to compress may be system-defined but configurable by a user. If a candidate tuple should not be compressed, at operation 720, the candidate tuple will be processed according to the configuration of the streaming application. If, however, the decision at operation 715 determines that a candidate tuple should be compressed, the method 700 may continue to operation 725.

At operation 725 the stream manager 134 may determine the available compression window. Determining the available compression window at operation 725 may include determining how much time the over-performing processing element has to compress the candidate tuple without impacting the overall performance of the streaming application. That is, the compression window includes the amount of time that an over-performing processing element can add to processing a particular tuple without becoming an underperforming processing element. The compression window may be the delta between the processing time at an over-performing processing element and the processing element that is providing its input. For example, if an over-performing processing element processes a tuple in 0.5 milliseconds and the processing element providing the input to the over-performing processing element processes a tuple in 1 millisecond, the compression window is 0.5 milliseconds. These 0.5 milliseconds represent the amount of time that the over-performing processing element can add to its processing time for a tuple without slowing the over-performing processing element to the point that it becomes slower than its input, i.e., underperforming.

At operation 730, the stream manager 134 may determine which compression technique is suitable for compressing the candidate tuple. The operation 730 may use the information determined in operations 710 and 725 to constrain the choice of compression techniques. For example, the determination of operation 730 may identify a compression technique based on the types of attributes contained within the candidate tuple. Operation 730 may consider how computationally intensive a particular technique is and accordingly the processing time that may be required to run the technique. In some embodiments, operation 730 may consider whether a lossy or lossless compression technique is appropriate for the type of data contained within the tuple. For example, lossy compression may be acceptable for a candidate tuple containing images, but may not be acceptable for a candidate tuple containing account numbers. Operation 730 may consider the amount of compression that is available from a particular technique. Other similar considerations may affect the type of compression techniques determined in operation 730.

At operation 735, the stream manager 134 may select a compression technique based on the available compression techniques determined in operation 730. The selected compression technique may be based on the technique that utilizes the largest amount of the compression window. In other embodiments, the selected compression technique may provide the largest reduction in the size of the candidate tuple. The compression technique that takes the most time and the compression technique that provides the largest reduction in tuple size may be the same compression technique. In other embodiments, the compression technique may include a weighing of the projected reduction in the size of the tuple, the expected amount of time for the compression technique to execute, the utilization of the compression window, and the amount of CPU resources that will be diverted to executing the compression technique. In some embodiments, the stream manager 134 may also account for the performance of the processing element that will receive the compressed tuple to minimize the impact that the decompression technique will have on the processing time of the recipient processing element. A compression technique may be selected that utilizes the additional processing capacity of a processing element without exceeding that additional processing capacity.

Once a compression technique has been selected in operation 735, the candidate tuple will be compressed by the overperforming processing element in operation 740. After the candidate tuple has been compressed in operation 740, the compressed tuple may be output to another processing element, as determined by the configuration of the streaming application, in operation 745. Upon receiving the compressed tuple, the recipient processing element will decompress the tuple in operation 750. The stream manager 134 may ensure that the decompression technique employed by the recipient processing element corresponds to the compression technique that was selected in operation 735. Once the compressed tuple has been decompressed, the recipient processing element may process the tuple according to the configuration of the streaming application. In some embodiments, the recipient processing element may be an overperforming processing element as well, and may compress the tuple before outputting to the next processing element.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to in this description and the claims that follow as a "circuit," "module," or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination thereof. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer-readable storage medium may be any tangible medium that can contain, or store, a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described in this description and the claims that follow. In addition, the program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described in this description and the claims that follow. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A system for processing a stream of tuples, comprising:
a plurality of processing elements configured to receive a stream of tuples, the plurality of processing elements operating on two or more compute nodes, each compute node having one or more computer processors, the two or more compute nodes communicatively coupled to each other using one or more communication networks;
a performance monitor configured to maintain one or more performance statistics corresponding to each of the plurality of processing elements, the one or more performance statistics indicating whether each of the plurality of processing elements has an additional processing capacity, wherein:
a first of the plurality of processing elements provides an input to a second of the plurality of processing elements, and
a third of the plurality of processing elements provides an input to the first processing element; and
a stream manager to:
determine whether a bandwidth of a communication network is low, and
configure the first processing element to employ compression on the stream of tuples if the first processing element has a first additional processing capacity, the second processing element has a second additional processing capacity, and the bandwidth of the communication network is low.

2. The system of claim 1, wherein the performance monitor is configured to indicate the first processing element has the first additional processing capacity if a first processing time for a tuple at the first processing element is less than a third processing time for a tuple at the third processing element.

3. The system of claim 1, wherein the performance monitor is configured to indicate the first processing element has the first additional processing capacity if a first latency for a tuple at the first processing element is less than a third latency for a tuple at the third processing element.

4. The system of claim 1, wherein the performance monitor is configured to indicate the first processing element has the first additional processing capacity if a first throughput of tuples for the first processing element is greater than a third throughput of tuples for the third processing element.

5. The system of claim 1, wherein the second processing element is configured to employ decompression on the stream of tuples.

6. A computer program product for processing a stream of tuples, the computer program product comprising a computer-readable storage medium having program code embodied therewith, the program code comprising computer-readable program code configured to:
   receive the stream of tuples to be processed by a plurality of processing elements operating on a plurality of compute nodes;
   determine whether a first of the plurality of processing elements has a first additional processing capacity, the first processing element providing an input to a second of the plurality of processing elements, wherein the determining of whether a first of the plurality of processing elements has a first additional processing capacity includes determining whether there are sufficient resources available to enable compression at the first processing element based on a comparison of the time available to compress a tuple at the first processing element versus the expected duration of running compression technique;
   determine whether the second processing element has a second additional processing capacity; and
   employ compression on a tuple of the stream of tuples at the first processing element if the first processing element has the first additional capacity and the second processing element has the second additional processing capacity.

7. The computer program product of claim 6, the employing compression at the first of the plurality of processing elements including:
   identifying a tuple as a candidate tuple, the candidate tuple being a candidate for compression;
   compressing data contents of the candidate tuple into a compressed tuple if a size metric of the candidate tuple falls outside a threshold and compressing the data contents of the candidate tuple will reduce the size metric by more than a reduction threshold; and
   transmitting the compressed tuple to the second of the plurality of processing elements.

8. The computer program product of claim 7, further comprising:
   identifying a tuple as a candidate tuple if one of the first additional processing capacity and the second additional processing capacity fall outside a threshold.

9. The computer program product of claim 7, the compressing the data contents of the candidate tuple further comprising:
   selecting a first of a plurality of compression techniques that utilizes the first additional processing capacity without exceeding the first additional processing capacity, wherein one or more characteristics of the candidate tuple identify a preference for lossy or lossless compression.

10. The computer program product of claim 6, further comprising:
    maintaining a processing element capacity history, the processing element capacity history including identifying whether the first and the second of the plurality of processing elements has the first and the second additional processing capacities; and
    determining a deployment configuration of the plurality of processing elements at compile time, wherein the determining is based on the processing element capacity history.

11. The computer program product of claim 9, further comprising:
    maintaining a processing element compression technique history, the processing element compression technique history including a processing element employing compression and a compression technique employed; and
    determining a deployment configuration of the plurality of processing elements at compile time, wherein the determining is based on the processing element compression technique history.

12. The system of claim 1, wherein the configuring the first processing element to employ compression on the stream of tuples includes determining whether there are sufficient resources available to enable compression at the first processing element based on a comparison of the time available to compress a tuple at the first processing element versus the expected duration of running compression technique.

13. The system of claim 1, wherein the configuring the first processing element to employ compression on the stream of tuples includes determining whether there are sufficient resources available to complete a decompression of a compressed tuple at the second processing element by determining that the second processing element has the second additional processing capacity.

* * * * *